April 15, 1958   J. RUMONOSKI   2,830,380
MACHINE SCREW GAUGE
Filed Aug. 9, 1955
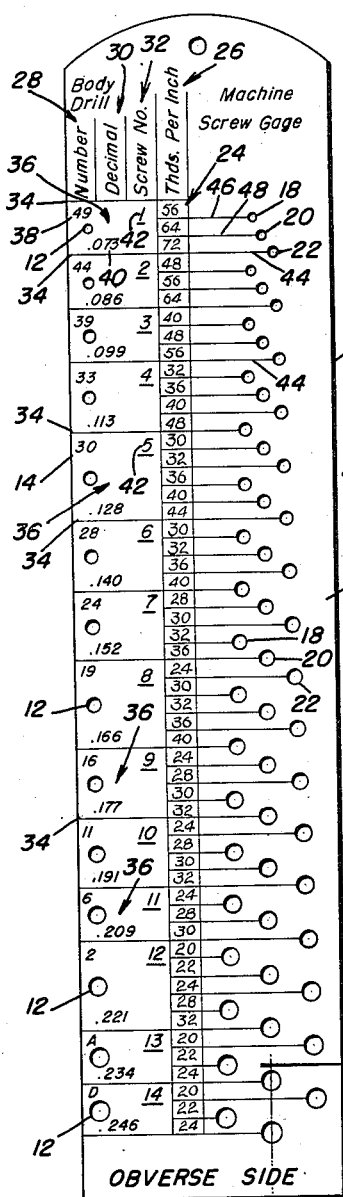
Fig.1
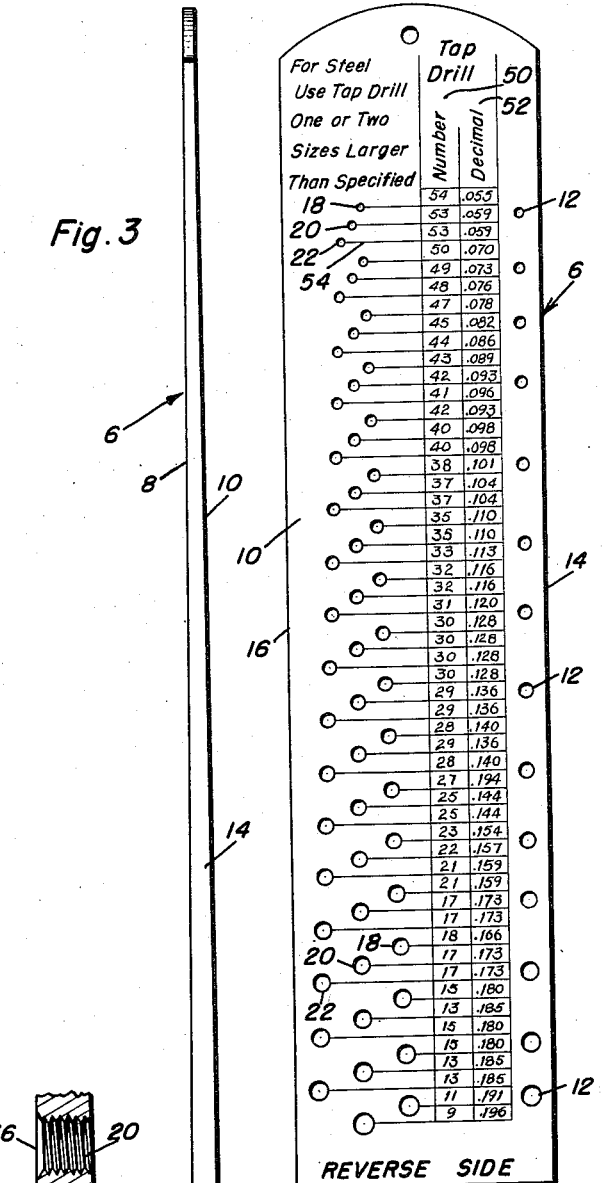
Fig.3
Fig.2
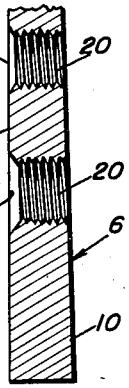
Fig.4
John Rumonoski
INVENTOR.

United States Patent Office 2,830,380
Patented Apr. 15, 1958

2,830,380

MACHINE SCREW GAUGE

John Rumonoski, Linden, N. J.

Application August 9, 1955, Serial No. 527,195

3 Claims. (Cl. 33—199)

This invention relates to a novel and improved machine screw gauge which is preferably, but not necessarily, of a so-called pocket size and is expressly constructed, efficaciously planned and otherwise designed to effectually present data which is regarded as desirable and necessary to a user in obtaining machine screw diameters, gauge number, threads per inch, tap and body drill sizes and their decimal equivalents with a view toward satisfactorily and quickly determining the size of drill which must be selected and used in various classes of work, the over-all new result being susceptible of accomplishment without resorting to the use of tools, charts, handbooks and the like.

With the above in mind, the invention is such in construction and adaptability that it constitutes a simple, economical and practical instrumentality which may be made in different sizes and materials for toolmakers, machinists, garage mechanics, electricians and, just as important, to aid a hardware dealer in serving members of the public seeking to buy screws of all dimensions in that it constitutes a time saver and functions to clearly and immediately reveal all data necessary for the size of screws on hand, thus avoiding the likelihood that purchased screws may be returned because they failed to fit, etc. Also, the invention is herein treated, for simplicity of presentation, for use of machine screws, but varying the information needed, it may be utilized, obviously, for wood screws.

It will be helpful and therefore desirable to take into account the currently existing slow, inconvenient and makeshift procedures in compiling information on machine screw characteristics. Ordinarily, the diameter of the threaded portion of a given screw is measured with a micrometer to determine its size in thousandths of an inch. This finding is then compared with the machine screw number, making it necessary to look up the needed information or data in handbooks, such as are published, for example, by American Machinist, Machinery, Marks, Audel's, etc. As is generally known, a thread gauge containing a limited number of leaves characterized by various pitches is used to compare the threaded portion of the machine screws to determine the threads per inch. As a matter of fact, it is often necessary to employ a second gauge containing a different range of pitches.

Continuing, to tap a hole to suit the machine screw on hand, it is usually necessary to consult a chart or one of the stated handbooks in order to obtain the tap drill number. Recommended tap drill sizes give about 75% of the full depth of threads. When tapping hard steel, a tap drill one or two sizes larger than specified may be used so as not to weaken the threads. In tapping soft metal, a smaller drill may be used when specified and a greater depth of thread obtained. In either case, it is necessary to know the size of drills in thousandths of an inch.

Where it is necessary to remove a broken machine screw from a piece of work, it is necessary to know the number or letter size of the needed drill in thousandths of an inch in order to select the correct size drill for a screw extractor to enter and remove the broken machine screw without injury to the threaded area in the work piece.

For the above and many other reasons which could be put forward, it is evident that there is an unquestionable need for a handy and time saving way and means to obtain complete machine screw data conveniently and quickly. To this end, the present invention has to do with a gauge which is characterized by a single flat piece of stock, stainless steel or any other suitable material, herein designated as a plate having obverse and reverse faces or sides and wherein no moving parts are present and wherein through the medium of scribed lines properly related and suitably attending information, the desired results may be attained. It is so constructed that if accidentally dropped, no damage can result due to the design and construction, and it may be used in one hand only by merely grasping it between the fingers and thumb, leaving the other hand free to hold the machine screws being compared and jotting down the information and other data obtained. And, too, the construction is such that persons not necessarily familiar with machine screws will be able to use the gauge correctly and accurately after nominal study and observation.

Other objects, features and advantages will become more readily apparent from the following description and the accompanying sheet of illustrative drawings.

In the drawings, wherein like numerals are employed to designate like parts throughout the views:

Figure 1 is a top plan view of a machine screw gauge constructed in accordance with the principles of the invention and revealing the aforementioned obverse side thereof;

Figure 2 is a bottom plan view showing the reverse side;

Figure 3 is an edge elevation; and

Figure 4 is an exaggerated fragmentary section on the line 4—4 of Figure 1, looking in the direction of the arrows.

Briefly, the preferred embodiment of the invention is characterized by a flat-face elongate plate having at least one drill hole conspicuously located in a marked isolated space on the obverse face of said plate and into which a selected screw is manually and temporarily inserted and tried for size, said hole being non-threaded and accompanied by closely cooperating complemental data in said space and which, when read, gives the predetermined screw number, 1 for example, the number, 49 for example, of a correspondingly sized body drill, the decimal size, .073 for example, of said body drill, said marked space being further accompanied by marginal columnized legends such as "Number" for said drill hole and said body drill, "Decimal" for the decimal size of said body drill and "Screw No." for the screw size of said drill hole, a column of prescribed numbers headed up and identified as "Thds Per Inch," said column having a vertical row of measurements such as "56–64–72" coordinated with the stated drill hole and its accompanying data, and a plurality of grouped tapped holes, one for each of the numbers 56–64–72, said tapped holes being correctly diametered and threaded, systematically grouped, and offset from said column but carefully lined up with their respective numbers for ready reference purposes.

Referring now to the views of the drawings with the aid of reference numerals and lead lines identifying the features, it will be noted that the aforementioned plate, or gauge proper, is denoted by the numeral 6. The plate is preferably tapered from what may be called the upper toward the lower end, that is, is gradually decreased in thickness to aid in manufacturing the same.

It has flat sides, and the obverse side or face is denoted at 8 while the reverse side is denoted at 10 (Figure 2). The machine screw characteristics and body drill essential prerequisites are charted on the obverse side 8 while information pertaining to and needed for the tap drill appears on the reverse side 10. These sides are coordinated to function in proper sequence or order. The numerals 12 to the left in Figure 1 denote test starting points, and each is specifically a hole which is hereinafter identified as a drill hole, that is, one which is non-threaded and of a prescribed diameter. A plurality of these holes is provided and arranged inwardly of the left hand edge 14 and in spaced relationship and form an aligned row. This row of holes extends approximately from the upper to the lower ends of the plate. There are similar holes provided toward the right edge 16, and these are arranged preferably in groups of three each. It is sufficient to refer only to the upper three holes 18, 20 and 22, and these are called tapped holes and are used to ascertain threads per inch. These groups of holes are arranged throughout the length of the plate, but it is not necessary to refer to all of the same. Positioned somewhat intermediate the holes 12 and the group 18, 20 and 22, there is a lengthwise column 24 defined by spaced parallel lines, and herein identified by the aligned heading 26 which reads "Thds Per Inch." To the left of this column and at the top, there are relatively short columns 28, 30 and 32 identified by the legend "Number," "Decimal" and "Screw No." Since the data which is to be used on this obverse side is repeated, as it were, it will simplify the description and understanding thereof to confine attention to the upper end portion wherein it will be observed that the lines 34 extending at right angles from the edge 14 and at right angles to the column 24 define a rectangular box 36. In this box, there is a single drill hole 12, and above the same and to the left appears the body drill number "49" here denoted by the numeral 38. The equivalent decimal notation which is in line with the decimal column 30 is designated ".073." In the upper corner of this box and preferably boldly printed is the screw number, and this is in alignment with the screw number column 32 and is denoted here by the numeral 42. Reverting to the decimal ".073," this is denoted by the numeral 40. The line 34 extends across the column 24 and its end portion 44 is lined up with and connected to the tapped hole 22. There are two lines 46 and 48 above it, and they also cross the column 24 and lead to their respective tapped holes 18 and 20. These several lines crossing the column transform the column into smaller boxes in which are contained the readings which are applicable to this particular area, and which appear as "56-64-72." This theme and arrangement of information is simply repeated below the area under consideration and need not be elaborated upon, it is believed.

On the reverse side, the vertical spaced parallel lines define two columns 50 and 52, the first column being for the "Number" of the tap drill and 53 designating the "Decimal" equivalent thereof. Here, we see the same holes 12 as well as 18, 20 and 22. The transverse spaced parallel lines 54 are arranged and cross the columns 50 and 52 and define small boxes, and also indicators leading to and aligned with the holes 18, 20 and 22, in an obvious manner. Take, for example, in the column 50, the numbers are respectively "54-53-53." The decimals corresponding are ".055-.059-.059."

With reference now to Figure 4, it will be seen that the tapped holes 18, 20 and 22 have their intake ends countersunk, as at 56, to facilitate piloting the test screws into place to check the cross-section and threads per inch.

As may be necessary, it is to be kept in mind that the aforementioned drill holes 12 are starting points and that all of the information in each area is oriented therefrom and in respect thereto. These holes correspond to the outside diameters of various sized machine screws.

The group of tapped holes 18, 20 and 22 may be classified as coarse, medium and fine threads enabling the user to intelligently make thread comparisons. What with these columnized readings, that is, numerals and legends in the order depicted on the drawings, the use of the gauge is substantially self-explanatory. It may be added, however, that the machine screw in question would be fitted into one of the drilled holes 12 in the vertical row which is located toward the edge 14 between the "Number" column and the "Decimal" column under the general heading of "Body Drill" on the obverse side of the gauge. With the machine screw in place, the body drill number, body drill decimal and machine screw number are obtained. To the right of the row of drilled holes 12 are the three tapped holes 18, 20 and 22 which show three holes but may include five tapped holes, for each drill hole they represent, these being boxed or "fenced in" in the manner illustrated. The machine screw (not shown) is then fitted into one of the tapped holes to determine the threads per inch. After locating, it is threaded flush or through to the reverse side 10 of the gauge. With the machine screw in this position, the threads per inch are obtained under this column on the obverse side, and on the reverse side will be found the tap drill number and the corresponding decimal indication or measurement.

It will be clear that with this instrument, gauging or comparing small diameter and short machine screws is quite simple, as the tapped holes are not below the surface of the gauge. Each tapped hole has a countersunk mouth to help to start the machine screw into the selected hole. Completely fabricated, the over-all weight of this instrument is negligible. In fact, it is sufficiently small for handy stowing and may be carried in one's pocket. Because of the flat surfaces, it will remain in position wherever it may be placed.

In using the row or column of holes 12, the machine screw may be held closely to the gauge and gradually brought up from the bottom to the top of the gauge, visually comparing its outside diameter with the drilled holes until an approximate location is found. The machine screw is then inserted and tried for size. If too loose, one or two holes above this one may be tried; or, if it does not enter, then one or two holes below may be found to fit. After the proper drilled hole has been located, its number, for example "1" is found. Also, it is clear that each of the tapped holes contains a greater or lesser number of threads per inch. With the machine screw in the intended position, all data desired may be obtained by consulting the various column headings on both sides of the gauge, these being self-explanatory.

The foregoing is considered as illustrative only of the principles of the invention. Further, since numerous modifications and equivalents may be resorted to by those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use in visually and accurately ascertaining and determining the general size range and all essential structural characteristics of and data on machine screws without the aid of information books, charts, gauging tools and the like, a self-contained pocket size machine screw gauge comprising a flat faced elongate plate having at least one drill hole conspicuously located in a marked isolated space on the obverse face of said plate and into which a selected screw is manually and temporarily inserted and tried for size, said hole being non-threaded and accompanied by closely cooperating complemental data in said space and which, when read, gives the predetermined screw number, the number 49 for example, of a correspondingly sized body drill, the decimal size, .073 for example of said body drill, said marked space being further accompanied by marginal columnized legends such as "Number" for said drill hole and said body drill, "Decimal" for the decimal size of said body drill and "Screw No." for the screw size of said drill hole, a column of prescribed numbers headed up and identified as "Thds Per Inch," said column having a vertical row of measurements such as "56–64–72" coordinated with the stated drill hole and its accompanying data, and a plurality of grouped tapped holes, one for each of the numbers 56–64–72, said tapped holes being correctly diametered and threaded, systematically grouped, and offset from said column but carefully lined up with their respective numbers for ready reference purposes, said marked space comprising a box, the latter defined by a pair of spaced parallel lines disposed at right angles to the lengthwise dimension of the plate and cooperating with one longitudinal edge of the plate and the adjacent "Thds Per Inch" column, and at least one of said lines extending across and beyond said column and terminating at and being aligned with one of said tapped holes, the 72 hole for example, and thus functioning to underscore 72 and to point out the tapped hole coordinated therewith, whereby all data oriented with said drill hole as a starting point is consolidated, easily readable and is clearly presented for use.

2. The structure defined in claim 1 and wherein said plate is provided with a plurality of spaced drill holes arranged lengthwise of the plate in row alignment with said row ranging approximately from one end to the other end of the plate, said drill holes progressively varying in diameter so that each one is different from the other one, each drill hole having a lined encompassing box and said box confining and being provided with the prerequisite distinguisable screw number and corresponding body drill number and equivalent decimal identification, said "Thds Per Inch" column likewise ranging approximately from end to end of the plate in parallelism with the adjacent longitudinal edge of the plate and being positioned to the right of the row of boxes, a plurality of groups of tapped holes to the right of said boxes and column, one group for each box, and being properly diametered and threaded to accomplish their intended threads per inch measuring purposes relative to their respective and coordinated drill holes, and additional spaced parallel lines crossing said column at right angles, leading to their respective tapped holes and providing relatively small boxes in said column, and predetermined measurement numbers in said small boxes aligned with and properly related to their respective tapped holes.

3. For use in visually and accurately ascertaining and determining the general size range and all essential structural characteristics of and data on machine screws without the aid of information books, charts, gauging tools and the like, a self-contained pocket size machine screw gauge comprising a flat faced elongate plate having at least one drill hole conspicuously located in a marked isolated space on the obverse face of said plate and into which a selected screw is manually and temporarily inserted and tried for size, said hole being non-threaded and accompanied by closely cooperating complemental data in said space and which, when read, gives the predetermined screw number, the number 49 for example, of a correspondingly sized body drill, the decimal size, .073 for example of said body drill, said marked space being further accompanied by marginal columnized legends such as "Number" for said drill hole and said body drill, "Decimal" for the decimal size of said body drill and "Screw No." for the screw size of said drill hole, a column of prescribed numbers headed up and identified as "Thds Per Inch," said column having a vertical row of measurements such as "56–64–72" coordinated with the stated drill hole and its accompanying data, and a plurality of grouped tapped holes, one for each of the numbers 56–64–72, said tapped holes being correctly diametered and threaded, systematically grouped, and offset from said column but carefully lined up with their respective numbers for ready reference purposes, all of said holes extending completely through the plate from the obverse to the reverse side, and columnized data on said reverse side lined up with said drill holes and tapped holes, there being at least two distinguishable columns, the first headed up with "Number" indicative of the required tap drill, and the second column headed up with "Decimal" applicable to the tap drill under advisement, and prescribed numbers such as 54–53–53 displayed in the first column and .055–.059 and .059 displayed in said second column side by side in the stated order and having underscoring lines leading at right angles from said first and second columns and joined in alignment to said tapped holes in the order prescribed, whereby when the properly sized screw is selectively screwed in the intended tapped hole from the obverse side until its leading end is flush with the surface of said reverse side, and the latter side is turned face up for reading, the required tap drill number, as well as its decimal identification, is thus automatically selected and then suitably noted for either current or subsequent use, and the entrance end of each hole on the obverse side of said plate being countersunk to, in this manner, facilitate the step of piloting the screw into any one or all of said holes, whereby to expediate the overall easy and quick handling of said gauge.

References Cited in the file of this patent

UNITED STATES PATENTS 2,728,145   Holladay _____ Dec. 27, 1955

OTHER REFERENCES

Stewart Screw and Nut Locator, advertising publication by Stewart Mfg. Co., Washington 9, D. C.